United States Patent
Karacas et al.

(10) Patent No.: US 10,069,882 B2
(45) Date of Patent: Sep. 4, 2018

(54) GENERATIVE VISUAL PUZZLE FOR ALIGNING CONNECTED DEVICES

(71) Applicant: Google Inc., Mountain View, CA (US)

(72) Inventors: Peter Karacas, New York, NY (US); James Sowden, Brooklyn, NY (US); Matthieu Lorrain, New York, NY (US); Bryan Rodman, New York, NY (US)

(73) Assignee: Google LLC, Mountain View, CA (US)

(*) Notice: Subject to any disclaimer, the term of this patent is extended or adjusted under 35 U.S.C. 154(b) by 193 days.

(21) Appl. No.: 15/243,873

(22) Filed: Aug. 22, 2016

(65) Prior Publication Data
US 2018/0054465 A1    Feb. 22, 2018

(51) Int. Cl.
*H04W 4/08* (2009.01)
*H04L 29/06* (2006.01)
*H04W 4/02* (2018.01)

(52) U.S. Cl.
CPC ........... *H04L 65/403* (2013.01); *H04W 4/025* (2013.01); *H04W 4/08* (2013.01)

(58) Field of Classification Search
CPC ........ H04L 65/403; H04W 4/025; H04W 4/08
See application file for complete search history.

(56) References Cited

U.S. PATENT DOCUMENTS

| | | | |
|---|---|---|---|
| 2005/0168399 A1* | 8/2005 | Palmquist | G06F 1/1601 345/1.1 |
| 2010/0144283 A1* | 6/2010 | Curcio | G06F 1/1626 455/66.1 |
| 2011/0230217 A1 | 9/2011 | Bailey et al. | |
| 2014/0132833 A1 | 5/2014 | Wang et al. | |
| 2015/0084837 A1 | 3/2015 | Mese | |
| 2016/0134428 A1* | 5/2016 | Ouyang | H04L 12/1822 709/204 |

OTHER PUBLICATIONS

PCT International Search Report & Written Opinion, Re: Application #PCT/US2017/048052, dated Nov. 1, 2017. 4 pages.

* cited by examiner

*Primary Examiner* — Kevin M Nguyen
(74) *Attorney, Agent, or Firm* — Lowenstein Sandler LLP (57) ABSTRACT

A request from a plurality of mobile devices to join a group may be received. A number of the mobile devices that have joined the group may be identified. Furthermore, a preliminary image may be selected based on the number of the mobile devices that have joined the group and portions of the preliminary image may be transmitted to the mobile devices. An indication of an arrangement of the mobile devices based on the transmitted portions of the preliminary image may be received. In response to receiving the indication of the arrangement of the mobile devices, a different video item of the video items representing the main video may be transmitted to each of the mobile devices according to the arrangement of the mobile devices.

20 Claims, 9 Drawing Sheets

GENERATIVE VISUAL PUZZLE FOR ALIGNING CONNECTED DEVICES

TECHNICAL FIELD

This disclosure relates to the field of mobile devices and, in particular, to a generative visual puzzle for aligning connected device.

BACKGROUND

A video content item platform may provide a video content item to mobile devices. For example, a particular video content item may be transmitted or streamed to a first mobile device as well as a second mobile device. Users of each of the first and second mobile devices may view the video content item that has been transmitted to their respective mobile device. Thus, the users may independently view the video content item without interacting with each other.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to receive one or more requests from a plurality of mobile devices to join a group of mobile devices to collectively present a main video on a combined display screen comprising display screens of the mobile devices where the main video is represented by a plurality of video items to be provided to the mobile devices, identify a number of the mobile devices that have joined the group, select a preliminary image based on the number of the mobile devices that have joined the group, transmit, by a processing device, portions of the selected preliminary image to the mobile devices, receive an indication of an arrangement of the mobile devices that enables a presentation of the transmitted portions of the preliminary image in an intended order, and in response to receiving the indication of the arrangement of the mobile devices, transmit a different video item of the plurality of video items representing the main video to each of the mobile devices according to the arrangement of the mobile devices.

In some implementations, a first portion of the preliminary image corresponds to a left portion of the preliminary image and a second portion of the preliminary image corresponds to a right portion of the preliminary image, and transmitting the different video item to each of the mobile devices according to the arrangement of the mobile devices comprises transmitting a first video item corresponding to a left portion of the main video to the mobile device that received the first portion corresponding to the left portion of the preliminary image and transmitting a second video item corresponding to a right portion of the main video to the mobile device that received the second portion corresponding to the right portion of the preliminary image.

In some implementations, the method may further identify a primary image based on the number of the mobile devices that have joined the group where each image in the selected set of images corresponds to a different portion of the primary image.

In some implementations, each of the different video items corresponds to a different view of the main video, wherein a first video item of the main video is associated with a first field of view and a second video item of the main video is associated with a second field of view, and wherein the first field of view is adjacent to the second field of view.

In some implementations, the method may identify a context associated with the mobile devices and select the preliminary image based on the identified context.

In some implementations, the context is at least one of a geographical location of one or more of the mobile devices or a time of when one or more of the mobile devices have joined the group.

In some implementations, the context is based on a type of the mobile devices that have joined the group.

In some implementations, a non-transitory machine-readable storage medium storing instructions may be executed to cause a processing device to receive one or more requests from a plurality of mobile devices to join a group of mobile devices to collectively present a main video on a combined display screen comprising display screens of the mobile devices where the main video is represented by a plurality of video items to be provided to the mobile devices, identify a number of the mobile devices that have joined the group, select a preliminary image based on the number of the mobile devices that have joined the group, transmit portions of the selected preliminary image to the mobile devices, receive an indication of an arrangement of the mobile devices that enables a presentation of the transmitted portions of the preliminary image in an intended order, and in response to receiving the indication of the arrangement of the mobile devices, transmit a different video item of the plurality of video items representing the main video to each of the mobile devices according to the arrangement of the mobile devices.

In some implementations, a system may include a memory and a processing device coupled with the memory. The processing device may receive one or more requests from a plurality of mobile devices to join a group of mobile devices to present a main video on a combined display screen comprising display screens of the mobile devices where the main video is represented by a plurality of video items to be provided to the mobile devices, identify a number of the mobile devices that have joined the group; select a primary image, divide the primary image into portions based on the number of mobile devices that have joined the group, transmit the portions of the primary image to the mobile devices, receive an indication of an arrangement of the mobile devices that enables a presentation of the transmitted portions of the preliminary image in an intended order, and in response to receiving the indication of the arrangement of the mobile devices, transmit a different video item of the plurality of video items representing the main video to each of the mobile devices based on the intended order.

BRIEF DESCRIPTION OF THE DRAWINGS

The present disclosure is illustrated by way of example, and not by way of limitation, in the figures of the accompanying drawings.

DETAILED DESCRIPTION

Aspects of the present disclosure are directed to providing a set of images to arrange a group of mobile devices. In general, multiple mobile devices may be combined together to provide a big screen experience for simultaneously displaying a video. In order to present scenes of a video on display screens of the mobile devices, multiple video content items representing the video can be provided (e.g., streamed) to the mobile devices. Each of the mobile devices may be used to display a portion of a scene of the video on the display screen of each of the mobile devices. As an example, a first video content item corresponding to a left portion of a scene of the video may be provided to a first mobile device, a second video content item corresponding to a center portion of the scene may be provided to a second mobile device, and a third video content item corresponding to a right portion of the scene may be provided to the third mobile device. Thus, the scenes of the video may be split across multiple mobile devices. The mobile devices may be connected or placed together to provide a collective interactive experience to each of the users of the mobile devices when viewing the entire scenes of the video across all of the mobile devices.

The mobile devices may be placed in a particular arrangement to accurately display the scenes represented by the video content items across each of the mobile devices. For example, the mobile device that is provided the left portion of each scene of the video may be placed to the left of the mobile device that is provided the center portion of each scene of the video, and the mobile device that is provided the right portion of each scene of the video may be placed to the right of the mobile device that is provided the center portion of each scene of the video. However, an initial arrangement of the mobile devices may not be accurate to appropriately display the portions of the scenes of the video represented by the video content items when the video content items are provided to the mobile devices. For example, the mobile device that is provided the center portion of each scene of the video may not be placed between the other mobile devices that are provided the left portion or the right portion. Thus, when the video content items are initially provided to the mobile devices, the scene of the video may not be accurately represented.

Aspects of the present disclosure address the above and other deficiencies by providing a set of media content items (e.g., images) that may be used to properly arrange the mobile devices before video content items representing the main video are provided to the mobile devices. For example, the set of media content items may correspond to portions of a preliminary image that are provided to the mobile devices before providing the video content items representing the main video. A first portion of the preliminary image may be provided to the first mobile device, a second portion of the preliminary image may be provided to the second mobile device, and a third portion of the preliminary image may be provided to the third mobile device. The different portions of the preliminary image may correspond to a puzzle that is to be solved by the users of the mobile devices. For example, a prompt may be provided to request users of the mobile devices to solve the puzzle by arranging the portions of the preliminary image in an order to correctly align the display screens of the mobile devices. Users may arrange or align the mobile devices based on the image portions that are displayed on each of the mobile devices so that the preliminary image is accurately displayed across the three mobile devices. Subsequently, the users may provide an indication that the arrangement of the mobile devices is proper and the main video represented by the video content items may be transmitted or provided to the mobile devices based on the prior image portions that were transmitted or provided to each of the mobile devices. For example, the first portion of the main video corresponding to the first video content item may be provided to the first mobile device that was previously provided the first portion of the preliminary image, the second portion of the main video corresponding to the second video content item may be provided to the second mobile device that was previously provided the second portion of the preliminary image, and the third portion of the main video corresponding to the third video content item may be provided to the third mobile device that was previously provided the third portion of the preliminary image.

As such, the portion of the main video represented by a video content item that is provided to each of the mobile devices may be based on the portion of the preliminary image that was earlier provided to the respective mobile devices.

In some embodiments, the preliminary image that is selected to be transmitted as separate image portions to the mobile devices may be based on a characteristic of the mobile devices. For example, the preliminary image may be selected based on a context of the mobile devices (e.g., a geographical location of the mobile devices, a demographic associated with at least one user of the mobile devices, etc.). The preliminary image may also be selected based on a number of the mobile devices. For example, a group of mobile devices may be used to display the main video represented by the video content items, and a particular preliminary image may be selected based on the number of mobile devices in the group.

Thus, aspects of the present disclosure may change a burdensome process of connecting and aligning mobile devices into a more enjoyable experience for users by having users solve the puzzle represented by portions of the preliminary image. The user interactions to align the mobile devices so that the main video is correctly represented across the display screens of the mobile devices may be simplified and more enjoyable to users.

Figure 1:
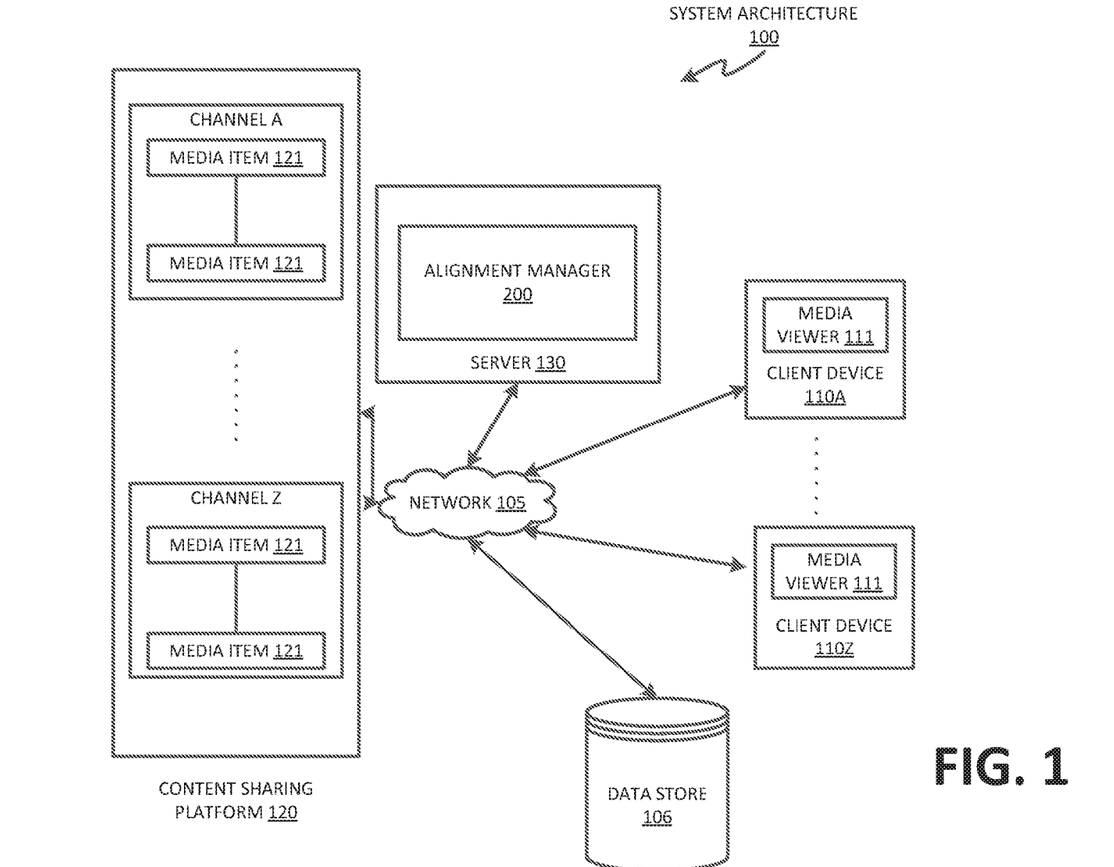
FIG. 1 illustrates an example system architecture in which implementations of the present disclosure may operate.

FIG. 1 illustrates an example system architecture 100, in accordance with one implementation of the disclosure. The system architecture 100 includes client devices (e.g., mobile devices) 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices" or "mobile devices." Each client device includes a media viewer 111. In one implementation, the media viewers 111 may be applications that allow users to view content, such as images, videos (e.g., video content items), web pages, documents, etc. For example, the media viewer 111 may be a web browser that can access, retrieve, present, and/or navigate content (e.g., web pages such as Hyper Text Markup Language (HTML) pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media content items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. In some embodiments, the content sharing platform 120 may provide a scene that is represented by multiple video content items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121 (i.e., content items or video content items). Examples of a media item 121 can include, and are not limited to, digital video, digital movies, digital photos, images, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a video content item.

A media item 121 may be consumed via the Internet and/or via a mobile device application. For brevity and simplicity, an online video (also hereinafter referred to as a video content item) is used as an example of a media item 121 throughout this document. As used herein, "media," "media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). The server 130 may be included in the content sharing platform 120 or be part of a different system. The server 130 may host an alignment manager 200 that identifies client devices 110A to 110Z that are grouped together to provide a large screen experience for presenting a media item 121, selects a primary image, provides portions of the primary image to the client devices 110A to 110Z to determine an arrangement of the client devices that enables a display of the portions of the primary image in an intended order, and subsequently provides portions of the media item 121 to the client devices according the determined arrangement. Further details with regard to the alignment manager 200 are disclosed in conjunction with FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
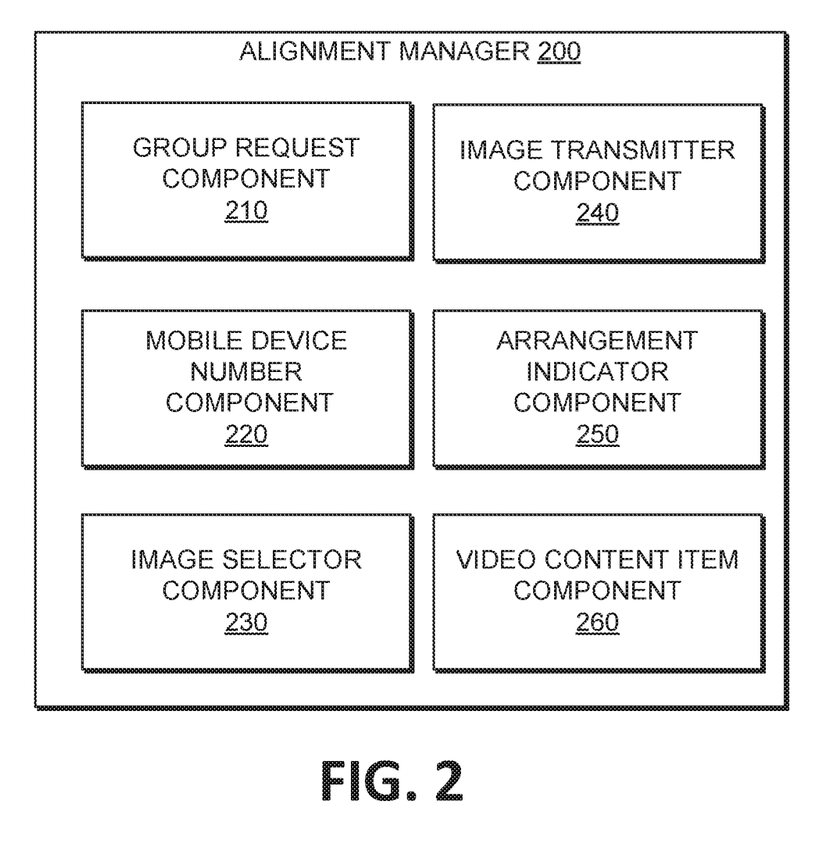
FIG. 2 illustrates an example alignment manager in accordance with some implementations of the disclosure.

FIG. 2 illustrates an example alignment manager 200. In general, the alignment manager 200 may correspond to the alignment manager 200 of a server system 130 as shown in FIG. 1. The alignment manager 200 may include a group request component 210, a mobile device number component 220, an image selector component 230, an image transmitter component 240, an arrangement indicator component 250, and a video content item component 260. In alternative implementations, the functionality of one or more of the components may be combined or divided.

As shown in FIG. 2, the alignment manager 200 may include a group request component 210 that may receive a request to create a group for multiple mobile devices. For example, the group request component 210 may receive a request from a first mobile device to initiate or create a group and additional requests from additional mobile devices to join the group of mobile devices created by the first mobile device. In some embodiments, the group request component 210 may provide an identification of the group and may receive an indication of the additional mobile devices to join the group based on the identification as described with respect to FIG. 4B. The alignment manager 200 may further include a mobile device number component 220 that may identify a number of mobile devices that are part of the created group. For example, a count of the mobile device that has created the group and the additional mobile devices that have subsequently joined the group may be determined. Furthermore, the image selector component 230 may select a preliminary image for aligning the display screens of the mobile devices in the group. In some embodiments, the preliminary image may be selected based on the number of the mobile devices that are part of the group and/or characteristics of at least one of the mobile devices. Further details with regard to selecting a preliminary image are described in conjunction with FIG. 5.

Referring to FIG. 2, the alignment manager 200 may further include an image transmitter component 240 that may transmit portions of the preliminary image to the mobile devices in the group. For example, for each mobile device that is included in the group, one portion of the preliminary image may be transmitted to the respective mobile device. Furthermore, the arrangement indicator component 250 may receive an indication of a completion of an arrangement (e.g., alignment) of the mobile devices after the portions of preliminary image are transmitted to the mobile devices. Further details with regard to the indication of the completion of the arrangement are described in conjunction with FIG. 4D. The alignment manager 200 may further include a video content item component 260 that may transmit video content items that represent a main video to the mobile devices. For example, a different video content item may be transmitted or provided to each of the mobile devices so that a scene is represented by a combination of each of the different video content items.

Figure 3:
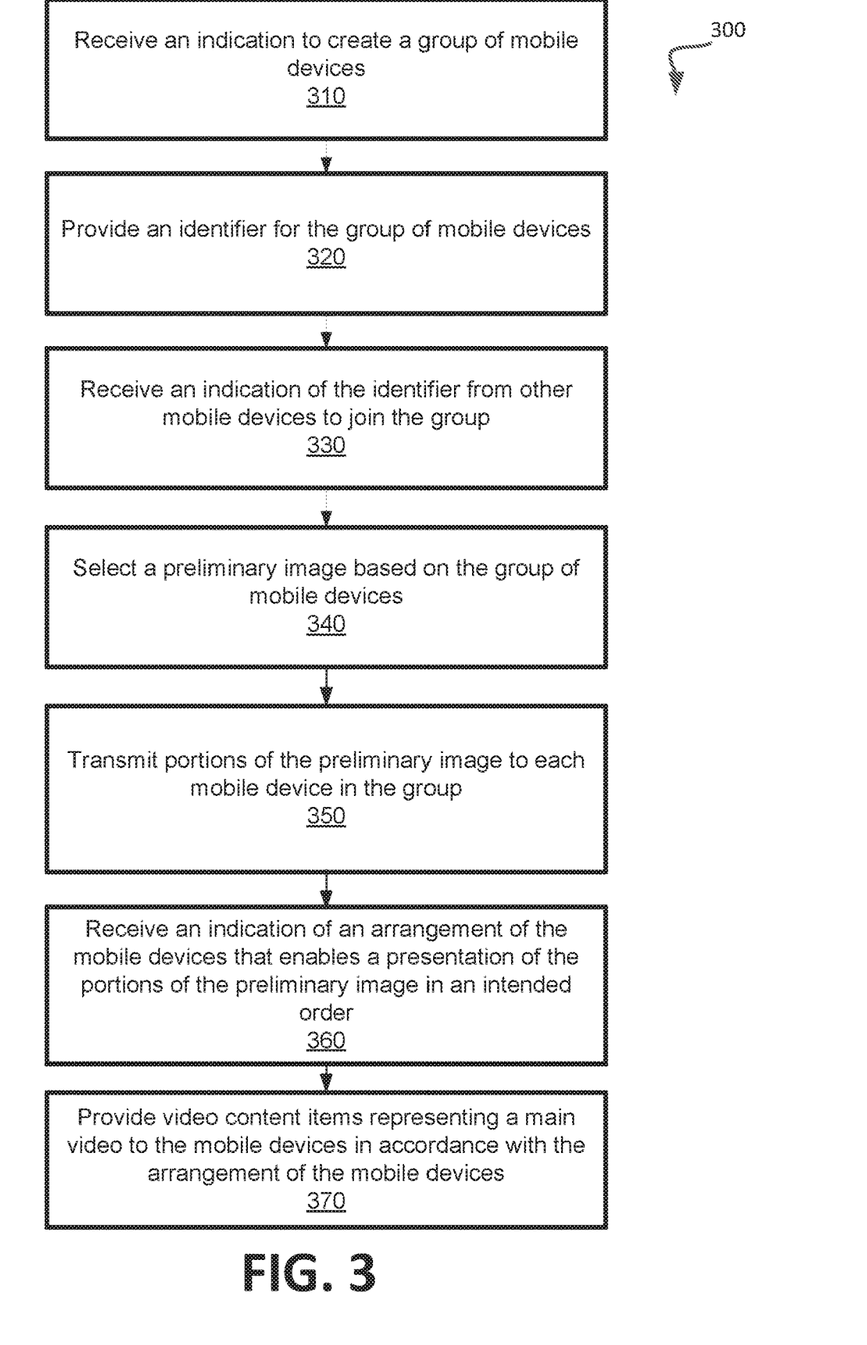
FIG. 3 is a flow diagram of an example method to provide video content items based on transmitted images in accordance with some implementations.

FIG. 3 is a flow diagram of an example method 300 to provide video content items based on transmitted images. In general, the method 300 may be performed by processing logic that may include hardware (e.g., processing device, circuitry, dedicated logic, programmable logic, microcode, etc.), software (e.g., instructions run on a processing device), or a combination thereof. In some implementations, the method 300 may be performed by the alignment manager 200 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 3, the method 300 may begin with the processing logic receiving an indication to create a group of mobile devices (block 310). The group is created to collectively present a main video on a large display screen resulting from the combining of the display screens of the mobile devices. For example, a request from a first mobile device to initiate a group corresponding to multiple mobile devices may be received. The processing logic may further provide an identifier for the group of mobile devices (block 320). In some embodiments, the identifier may be provided to the first mobile device that has provided the request to initiate the group of mobile devices. The identifier may be a code (e.g., a series of numbers), a password, or any other alphanumeric string of characters. The first mobile device may provide the identifier to other mobile devices (e.g., upon a request of the user of the first user device) to join the group. The processing logic may subsequently receive an indication of the identifier from other mobile devices to join the group (block 330). For example, the indication may include the code, password, or other such alphanumeric string of characters that was previously sent to the first mobile device and the indication may be received from other mobile devices. If the received identifier from the mobile devices matches the identifier provided to the first mobile device, then the corresponding mobile device may be added to the group of mobile devices. Otherwise, if the received identifier from a mobile device does not match with the identifier provided to the first mobile device, then the corresponding mobile device may not be added to the group of mobile devices.

Referring to FIG. 3, the processing logic may select a preliminary image based on the group of mobile devices (block 340). The preliminary image may be selected based on a characteristic associated with mobile devices of the group and/or a number or count of mobile devices that are included in the group as described in further detail in conjunction with FIG. 5. In some embodiments, a different preliminary image may be selected each time that users of the mobile devices join a group of mobile devices. The processing logic may further transmit portions of the preliminary image to each mobile device in the group (block 350). The portions of the preliminary image may be transmitted to determine an arrangement of the mobile devices that enables a presentation of the portions of the preliminary image in an intended order (i.e., the order, which when used to present the transmitted portions, would result in the combination matching the preliminary image). In some embodiments, each portion of the preliminary image may include an indication that identifies the position a respective portion of the preliminary image should be placed or located with respect to the other portions of the preliminary image. As described in further detail below, the selected preliminary image may be split or divided into portions of the preliminary image and the different image portions may be transmitted to the mobile devices in the group so that each mobile device receives a different portion of the preliminary image. For example, the preliminary image may be of a larger size than the individual transmitted image portions and a combination of the different image portions may correspond to the preliminary image. A prompt may be displayed with the transmitted portions of the preliminary image asking the users of the mobile devices to solve the puzzle corresponding to arranging the portions of the preliminary image in a correct order by moving the mobile devices in a particular alignment. Users of the mobile devices may reorganize or continue to move the mobile devices to solve the puzzle and properly arrange the mobile devices so that the different image portions are presented on the mobile devices in an intended order. The processing logic may subsequently receive an indication of an arrangement of the mobile devices that enables a presentation of the portions of the preliminary image in an intended order (block 360). The indication of the arrangement may be received after the image portions have been transmitted to the mobile devices in the group based on the preliminary image. In some embodiments, the indication may identify a location of each of the mobile devices with respect to other mobile devices (e.g., a column and row identifier or a position along a vertical or horizontal axis or direction), and the location of each mobile device may be stored in a data store in association with the main video. Further details with regard to the indication of the arrangement of the mobile devices are described in conjunction with FIG. 4D.

The processing logic may further provide video content items representing the main video to the mobile devices in the group in accordance with the arrangement of the mobile devices (block 370). The video content items may correspond to different portions of a scene of the main video. In some implementations, the video content items may have an intended order, which ensures that the video content items, when played together on a combined display screen, match the main video. The order of each video content item may be specified as metadata (e.g., a column and row identifier or a position along a vertical or horizontal axis or direction) of the video content item or stored in a data store with an identifier of a respective video content item. The processing logic may determine what mobile devices should receive specific video content items based on the order of each video content and the arrangement of the mobile devices that was determined using the portions of the preliminary image.

The different video content items may be transmitted or provided to the different mobile devices based on the respective image portions that were previously transmitted to the mobile devices. For example, a first video content item corresponding to a left portion of a scene of the main video may be transmitted to the mobile device of the group that previously received a left portion of the preliminary image, a second video content item corresponding to a center portion of the scene of the main video may be transmitted to the mobile device of the group that previously received a center portion of the preliminary image, and a third video content item corresponding to a right portion of the scene of the main video may be transmitted to the mobile device of the group that previously received a right portion of the preliminary image. Thus, the different portions of the scene of the main video may correspond to different fields of view of the scene. For example, the first field of view may be provided by the first video content item, a second field of view that is adjacent to the first field of view may be provided by the second video content item, and the third field of view may be provided by the third video content item and may be adjacent to the second field of view. Thus, the scene may be represented by three video content items that each provide a different field of view of the scene. In some embodiments, the transmitted video content items may include an identification of where in the alignment of the respective mobile device receiving the video content item should be placed with respect to the other mobile devices.

In some embodiments, after the video content items are provided to the mobile devices, the video content items may initiate playback on each respective mobile device. In the same or alternative embodiments, the playback may be initiated when each mobile device of the group has been provided the video content item.

Figure 4A:
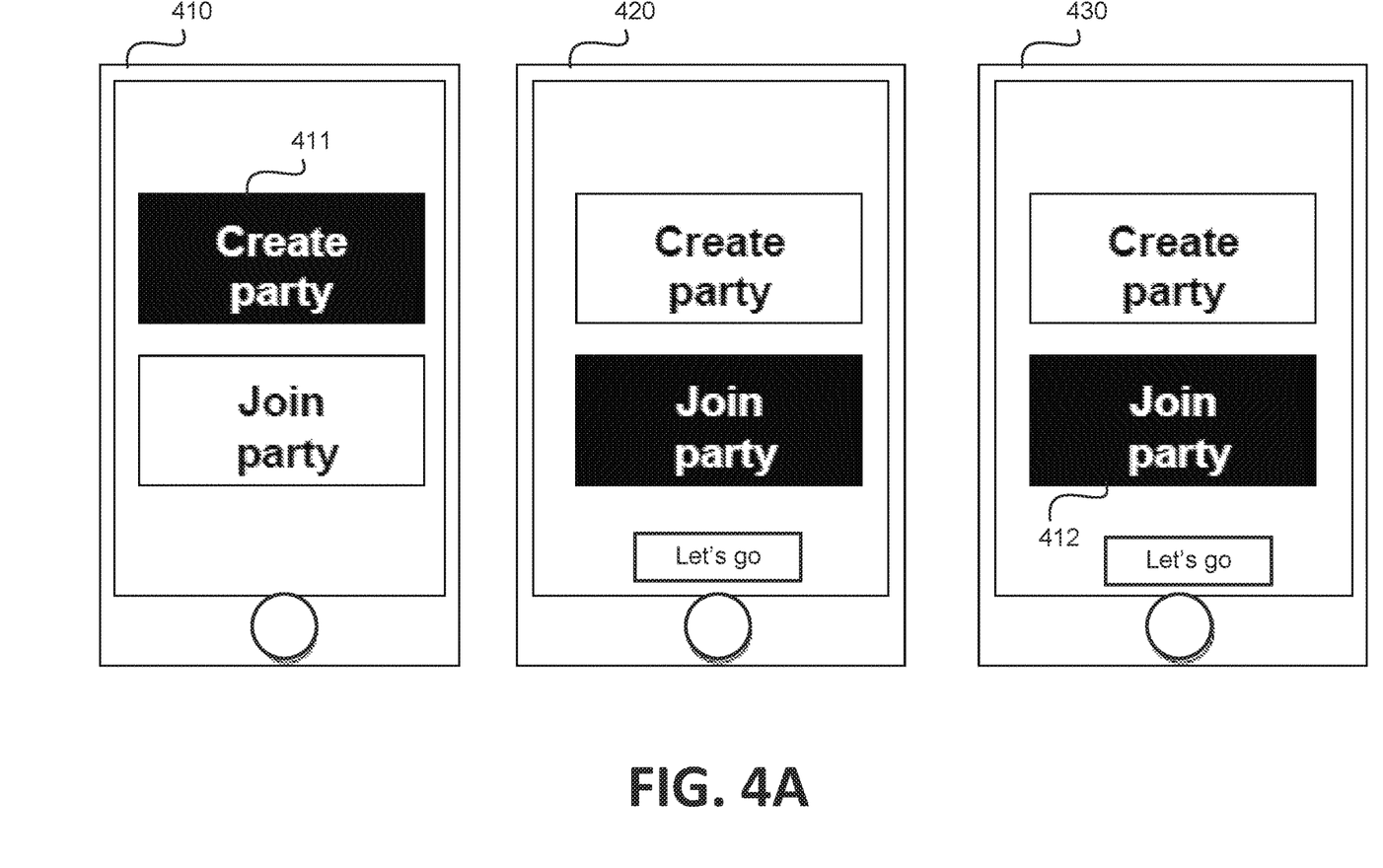
FIG. 4A illustrates a group of mobile devices in accordance with some implementations.

FIG. 4A illustrates a group of mobile devices to create and join a group of mobile devices, according to some aspects of the present disclosure. The group of mobile devices 410, 420, and 430 may receive images and video content items from the alignment manager 200 of FIGS. 1 and 2.

As shown in FIG. 4A, a first mobile device 410 may provide a request to create or initiate a group of mobile devices. For example, the request may be received in response to a selection of a graphical user interface (GUI)

element 411 to create a party or group of mobile devices. The second mobile device 420 and the third mobile device 430 may provide a request to join a party or group of mobile devices in response to a selection of a GUI element 412. Although FIG. 4A shows an example of three mobile devices in the group, any number of mobile devices may join the group.

Figure 4B:
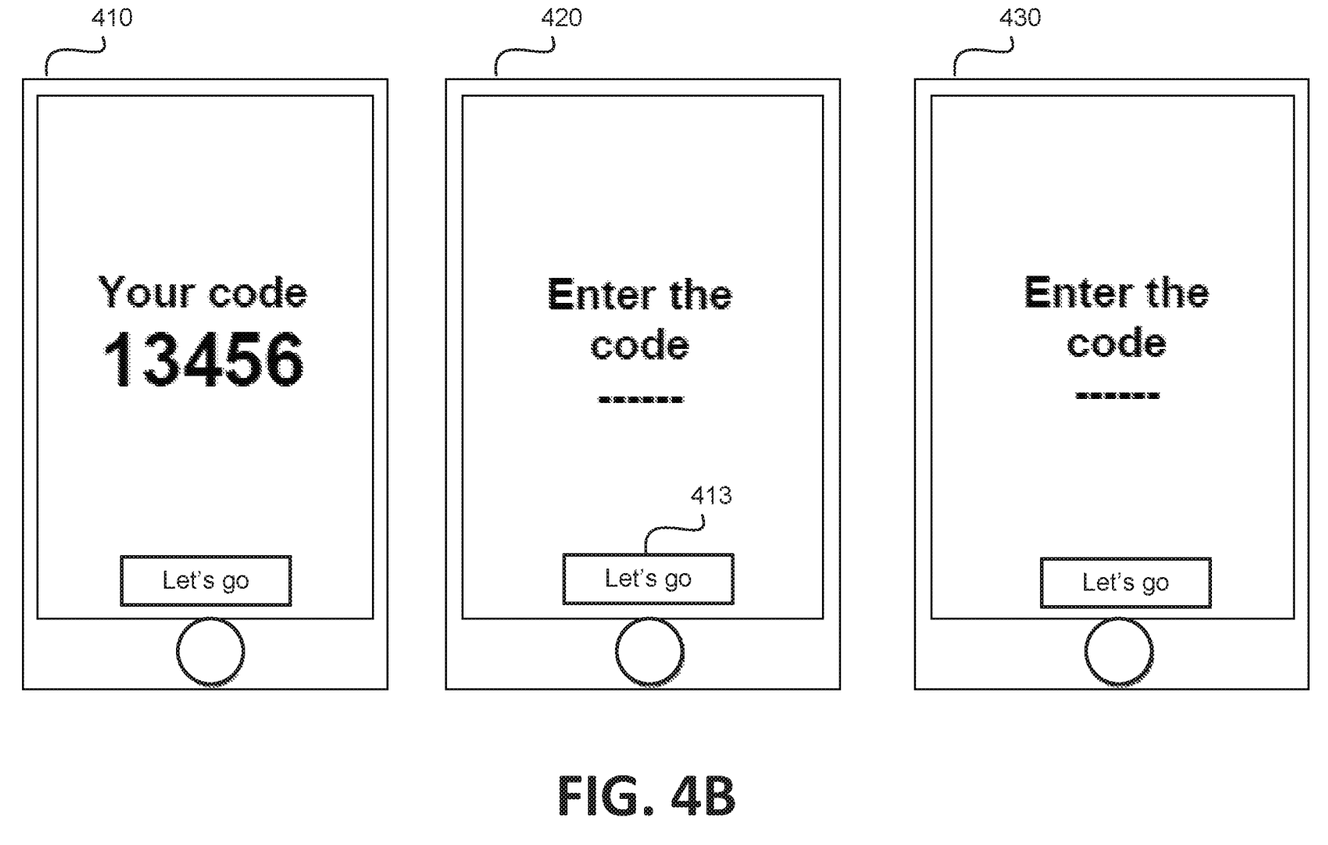
FIG. 4B illustrates an example user interface to join a group of mobile devices in accordance with some implementations.

FIG. 4B illustrates an example user interface to join a group of mobile devices, according to some aspects of the present disclosure. FIG. 4B may represent the mobile devices of FIG. 4A after the first mobile device 410 has initiated a request to create a group of mobile devices and the second and third mobile devices 420 and 430 have received an indication to join a group of mobile devices. As shown, the first mobile device 410 may be provided a code that other mobile devices may use to join the group created or initiated by the first mobile device 410. In some embodiments, the code may be provided to the first mobile device over a network. Additionally, the user interface of the second mobile device 420 and the third mobile device 430 may change to allow a code to be entered into the respective mobile devices 420 and 430. After the code has been input in the respective user interfaces, an indication of the code and for the mobile device to join the group may be transmitted in response to a selection of the GUI element 413.

Figure 4C:
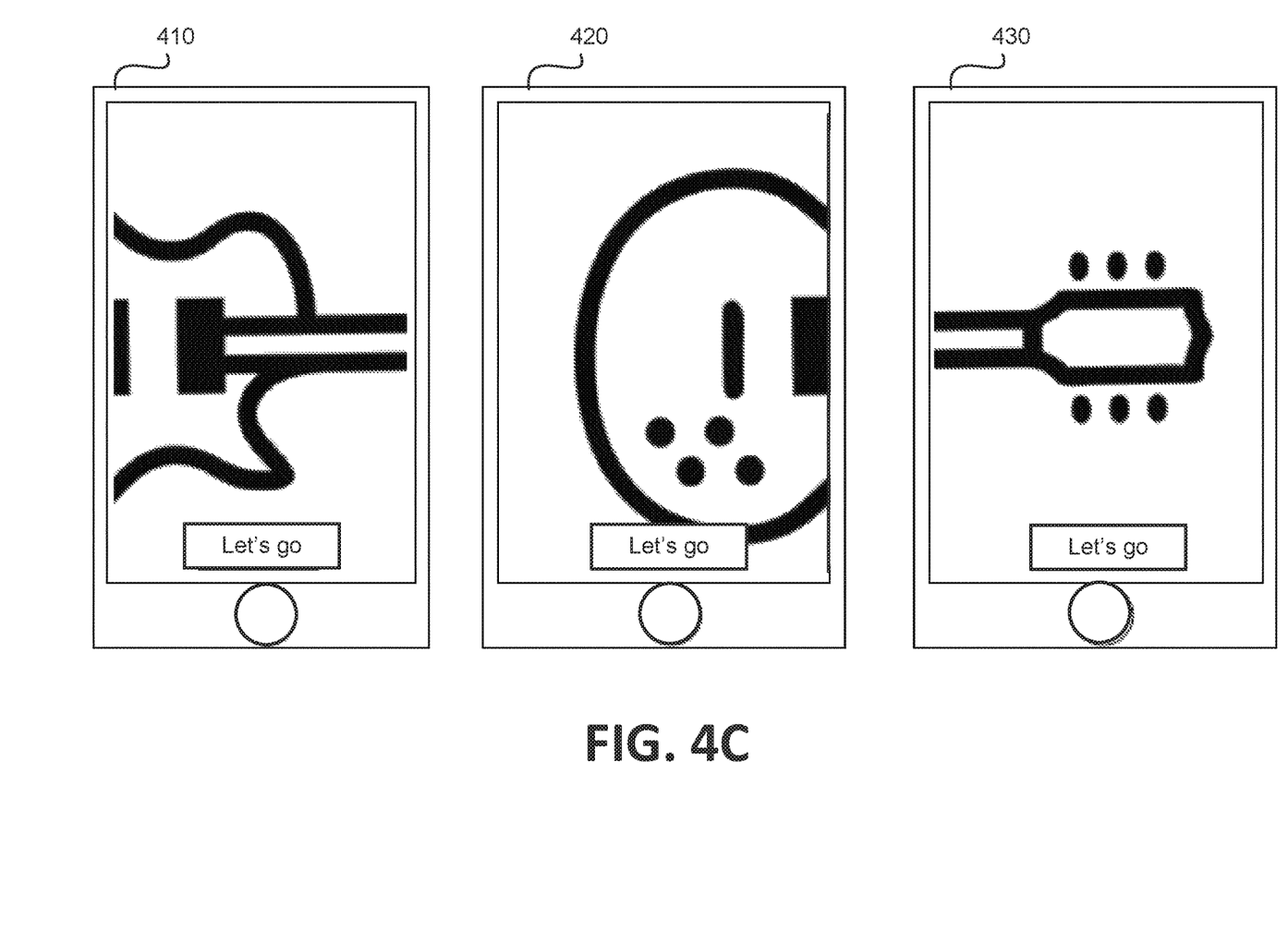
FIG. 4C illustrates an example portions of a preliminary image provided to the group of mobile devices in accordance with some implementations.

FIG. 4C illustrates an example set of image portions provided to the group of mobile devices, according to some aspects of the disclosure. In particular, FIG. 4C may show the mobile devices of FIG. 4B after the second mobile device 420 and third mobile device 430 have joined the group of mobile devices and each of the mobile devices 410, 420, and 430 have provided a request pertaining to a preliminary image to align or arrange the mobile devices 410, 420, and 430 for providing a combined screen. As shown, the first, second, and third mobile devices 410, 420, and 430 may receive different portions of a preliminary image. For example, the preliminary image may represent a guitar and the image portion received by the first mobile device 410 may correspond to a center portion of the guitar, the image portion received by the second mobile device 420 may correspond to a left portion of the guitar, and the image portion received by the third mobile device 430 may correspond to a right portion of the guitar. Thus, the preliminary image corresponding to a guitar may be split or divided into three separate portions of the guitar.

Figure 4D:
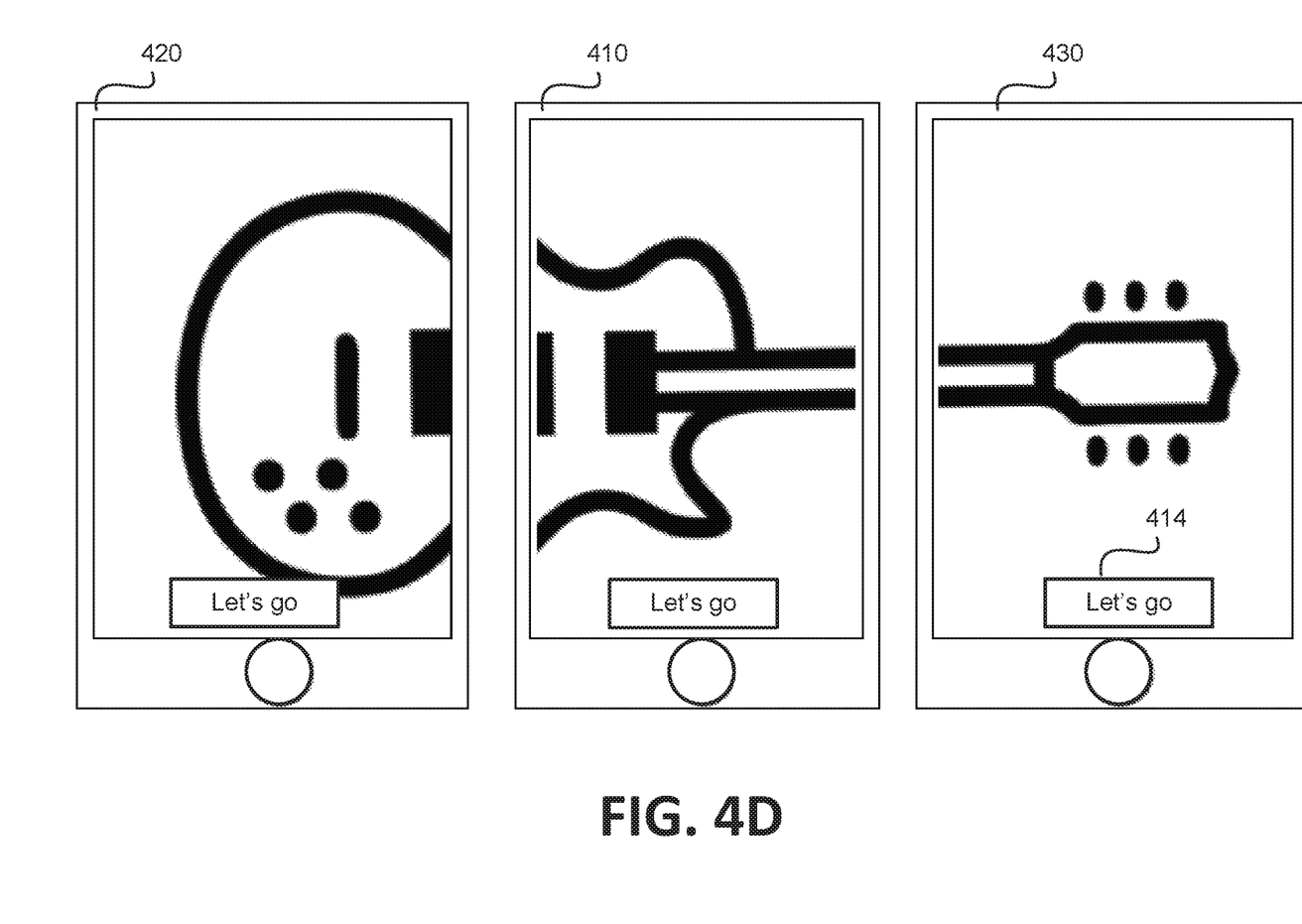
FIG. 4D illustrates an example arrangement of the group of mobile devices based on the transmitted portions of the preliminary in accordance with some implementations.

FIG. 4D illustrates an example arrangement of the group of mobile devices based on the transmitted portions of a preliminary image, according to some aspects of the disclosure. In particular, FIG. 4D may represent the mobile devices 410, 420, and 430 of FIG. 4C after the mobile devices have been arranged or aligned based on the transmitted set of portions of the preliminary image. For example, as shown, the first mobile device 410 may switch locations with the second mobile device 420 to properly display the preliminary image with the different image portions displayed between the first mobile device 410, second mobile device 420, and third mobile device 430. After the first, second, and third mobile devices 410, 420, and 430 have been arranged or aligned based on the transmitted set of image portions, a request to receive video content items representing the main video at the mobile devices may be received in response to a selection of the GUI element 414 from each of the mobile devices 410, 420, and 430. After each mobile device 410, 420, and 430 has provided a request to a receive video content item, the video content items may be provided to the respective mobile device based on the image portion that was previously transmitted to each respective mobile device 410, 420, and 430.

As previously described, the video content items transmitted to each of the mobile devices may correspond to a main video or a scene. For example, the video content items may correspond to different fields of view of the scene so that a first video content item provided to the second mobile device 420 may be adjacent to or overlap with a portion of the field of view of the scene associated with a second video content item that is provided to the first mobile device 410.

Figure 5:
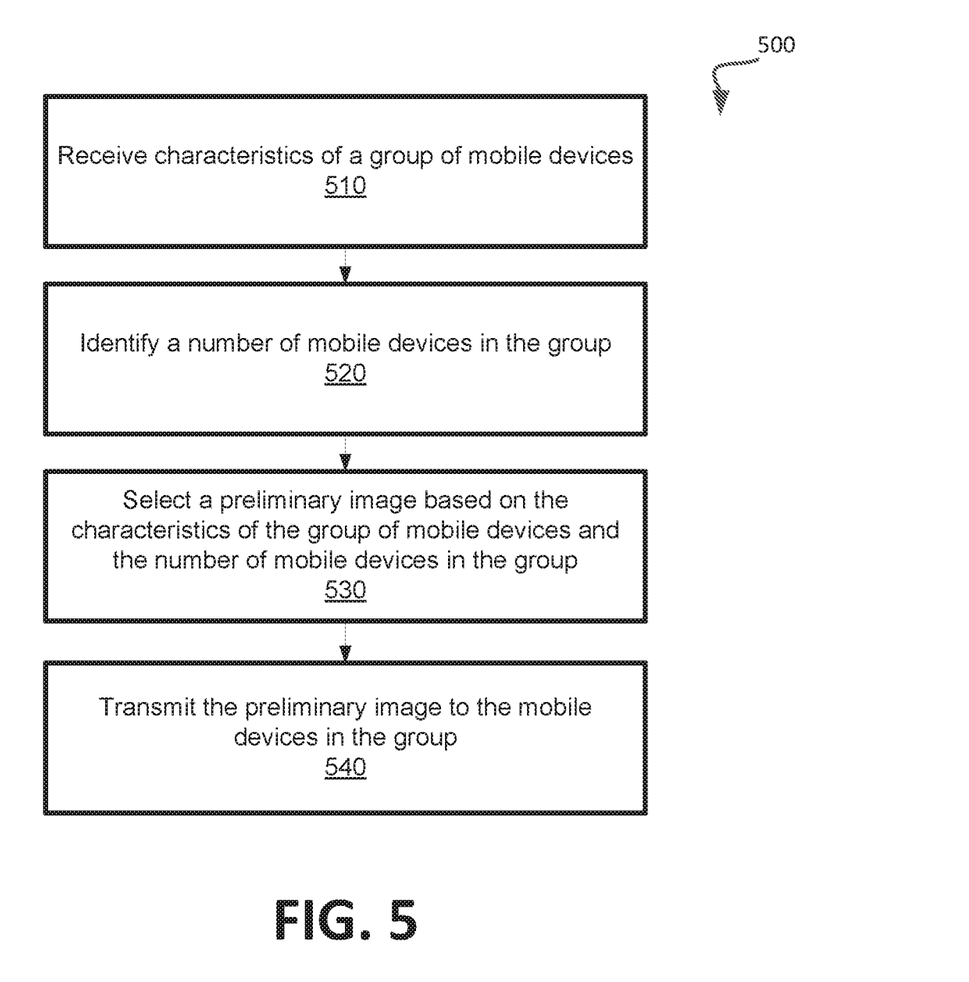
FIG. 5 is a flow diagram of an example method to transmit portions of a primary image in accordance with some implementations.

FIG. 5 is a flow diagram of an example method to transmit a set of images based on a selected primary image. In general, the method 500 may be performed by processing logic that may include hardware (e.g., processing device, circuitry, dedicated logic, programmable logic, microcode, etc.), software (e.g., instructions run on a processing device), or a combination thereof. In some implementations, the method 500 may be performed by the alignment manager 200 of FIG. 1 or 2.

As shown in FIG. 5, the method 500 may begin with the processing logic receiving characteristics of a group of mobile devices that provide a combined screen for presenting a main video (block 510). The characteristics may correspond to a location of one or more of the mobile devices that are included in the group, demographic information of at least one user of the mobile devices, a time in which one or more of the mobile devices created the group or joined the group, or any other characteristic associated with the mobile devices or users of the mobile devices. The processing logic may further identify a number of mobile devices that are in the group (block 520). For example, the number of devices that have created the group and that have joined the group may be identified.

Referring to FIG. 5, the processing logic may select a preliminary image based on the characteristics of the group of mobile devices and the number of mobile devices that are in the group (block 530). A particular preliminary image may be provided for a particular number of mobile devices. For example, a first preliminary image may be eligible to be used as transmitted image portions based on a first number of devices being in a group and a second primary image may be eligible to be used as the transmitted image portions to the mobile devices based on a different second number of devices being in a group. A corresponding preliminary image may be selected if an eligible number of devices for the preliminary image matches with the number of devices that are in the group.

Furthermore, a particular preliminary image may be selected based on at least one of the characteristics of the group of mobile devices. For example, the characteristic may correspond to a time when the group of mobile devices was created, an average time for when mobile devices joined the group, or a time when the last mobile device had joined the group. A preliminary image corresponding to such a time may be selected. For example, if the time when the group was created was approximate to a time for sunset, then a preliminary image of a sunset may be selected to be transmitted as different portions of images to the mobile devices of the group. In the same or alternative embodiments, a demographic characteristic of one or more users of the group of mobile devices may be selected. For example, an interest category of one or more of the users may be identified and a preliminary image that depicts an object or scene pertaining to the interest category may be selected. For example, if one of the users is known to have an interest in music, then the preliminary image of a guitar may be selected to be transmitted as different portions of the image to the mobile devices of the group.

The preliminary image may be selected based on a characteristic corresponding to a geographical location of one or more mobile devices that have joined the group. For example, a preliminary image depicting a local landmark may be selected to be transmitted as different portions of the image to the mobile devices of the group when at least one of the mobile devices is at a geographical location approximate to the local landmark. In the same or alternative embodiments, the preliminary image may be selected based on a type of mobile devices that have joined the group. For example, if the mobile devices are cellular phones with a smaller display screen, then a preliminary image with a smaller size and/or resolution may be selected as opposed to another preliminary image with a larger size and/or resolution which may be used to transmit images to mobile devices that are tablets or other such cellular devices with larger display screens. The processing logic may subsequently transmit the preliminary image to the mobile devices in the group (block 540). For example, different portions of the preliminary image may be transmitted to each mobile device that has joined the group.

Figure 6:
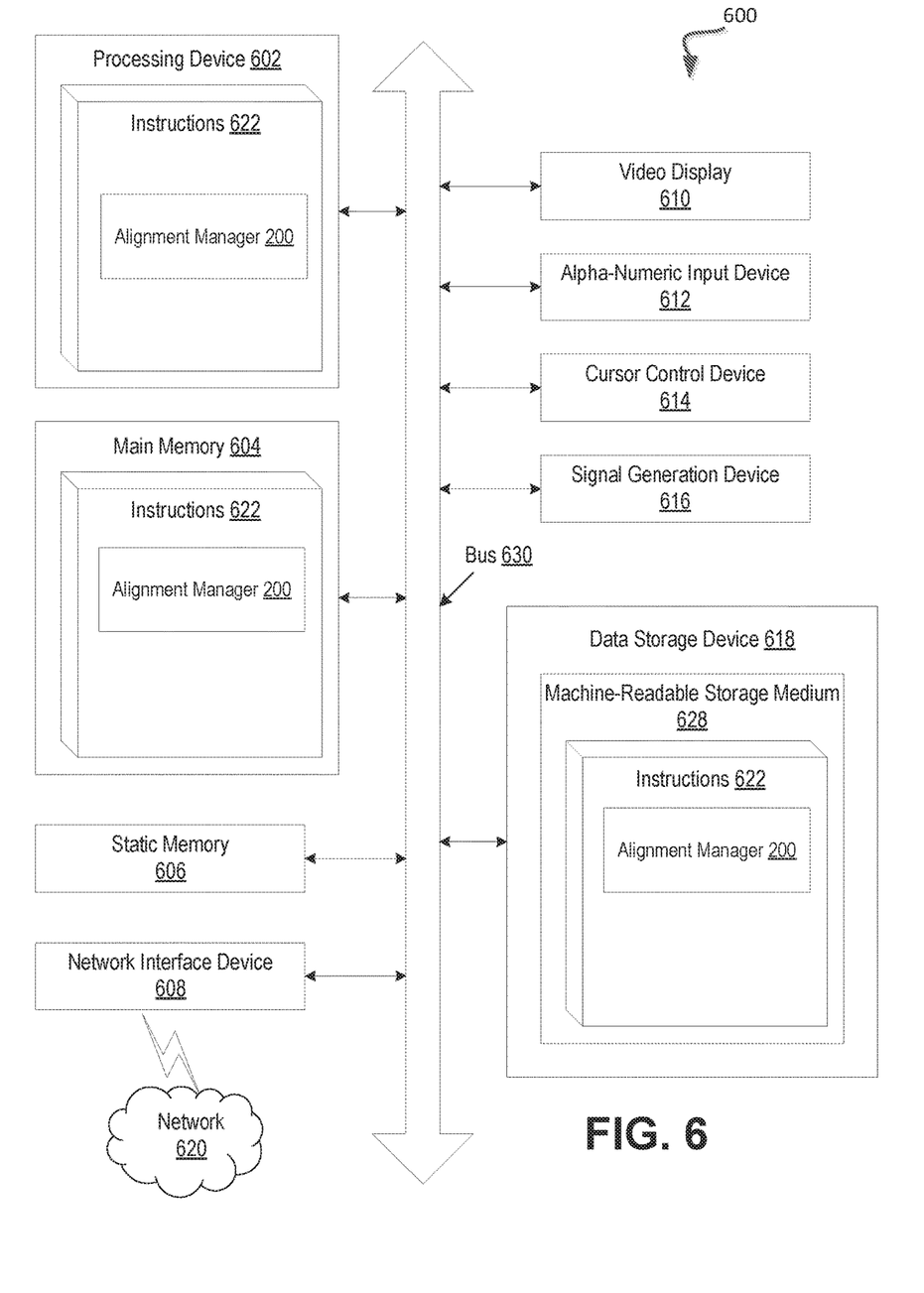
FIG. 6 illustrates a block diagram of an implementation of a computer system in which some implementations of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM, etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for an alignment manager (e.g., alignment manager 200 of FIG. 1 or 2) and/or a software library containing methods that functionality in an alignment manager. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    receiving one or more requests from a plurality of mobile devices to join a group of mobile devices to collectively present a main video on a combined display screen comprising display screens of the mobile devices, the main video represented by a plurality of video items to be provided to the mobile devices;
    identifying a number of the mobile devices that have joined the group;
    selecting a preliminary image based on the number of the mobile devices that have joined the group;
    transmitting, by a processing device, portions of the selected preliminary image to the mobile devices;
    receiving an indication of an arrangement of the mobile devices that enables a presentation of the transmitted portions of the preliminary image in an intended order; and
    in response to receiving the indication of the arrangement of the mobile devices, transmitting a different video item of the plurality of video items representing the main video to each of the mobile devices according to the arrangement of the mobile devices.

2. The method of claim 1, wherein a first portion of the preliminary image corresponds to a left portion of the preliminary image and a second portion of the preliminary image corresponds to a right portion of the preliminary image, and wherein transmitting the different video item to each of the mobile devices according to the arrangement of the mobile devices comprises:
    transmitting a first video item corresponding to a left portion of the main video to the mobile device that received the first portion corresponding to the left portion of the preliminary image; and
    transmitting a second video item corresponding to a right portion of the main video to the mobile device that received the second portion corresponding to the right portion of the preliminary image.

3. The method of claim 1, wherein each portion of the preliminary image corresponds to a different portion of the preliminary image that is provided to a different mobile device.

4. The method of claim 1, wherein each of the different video items corresponds to a different view of the main video, wherein a first video item of the main video is associated with a first field of view and a second video item of the main video is associated with a second field of view, and wherein the first field of view is adjacent to the second field of view.

5. The method of claim 1, further comprising:
    identifying a context associated with the mobile devices, wherein the preliminary image is further selected based on the identified context.

6. The method of claim 5, wherein the context is at least one of a geographical location of one or more of the mobile devices or a time of when one or more of the mobile devices have joined the group.

7. The method of claim 5, wherein the context is based on a type of a mobile device that has joined the group.

8. A non-transitory machine-readable storage medium storing instructions which, when executed, cause a processing device to perform operations comprising:
    receiving one or more requests from a plurality of mobile devices to join a group of mobile devices to collectively present a main video on a combined display screen comprising display screens of the mobile devices, the main video represented by a plurality of video items to be provided to the mobile devices;
    identifying a number of the mobile devices that have joined the group;
    selecting a preliminary image based on the number of the mobile devices that have joined the group;
    transmitting portions of the selected preliminary image to the mobile devices;
    receiving an indication of an arrangement of the mobile devices that enables a presentation of the transmitted portions of the preliminary image in an intended order; and
    in response to receiving the indication of the arrangement of the mobile devices, transmitting a different video item of the plurality of video items representing the main video to each of the mobile devices according to the arrangement of the mobile devices.

9. The non-transitory machine-readable storage medium of claim 8, wherein a first portion of the preliminary image corresponds to a left portion of the preliminary image and a second portion of the preliminary image corresponds to a right portion of the preliminary image, and wherein to transmit the different video item to each of the mobile devices according to the arrangement of the mobile devices, the operations further comprise:

transmitting a first video item corresponding to a left portion of the main video to the mobile device that received the first portion corresponding to the left portion of the preliminary image; and transmitting a second video item corresponding to a right portion of the main video to the mobile device that received the second portion corresponding to the right portion of the preliminary image.

10. The non-transitory machine-readable storage medium of claim 8, wherein each portion of the preliminary image corresponds to a different portion of the preliminary image that is provided to a different mobile device.

11. The non-transitory machine-readable storage medium of claim 8, wherein each of the different video items corresponds to a different view of the main video, wherein a first video item of the main video is associated with a first field of view and a second video item of the main video is associated with a second field of view, and wherein the first field of view is adjacent to the second field of view.

12. The non-transitory machine-readable storage medium of claim 8, the operations further comprising:

identifying a context associated with the mobile devices, wherein the preliminary image is further selected based on the identified context.

13. The non-transitory machine-readable storage medium of claim 12, wherein the context is at least one of a geographical location of one or more of the mobile devices or a time of when one or more of the mobile devices have joined the group.

14. The non-transitory machine-readable storage medium of claim 12, wherein the context is based on a type of a mobile device that has joined the group.

15. A system comprising:
a memory; and
a processing device, operatively coupled with the memory, to:
receive one or more requests from a plurality of mobile devices to join a group of mobile devices to present a main video on a combined display screen comprising display screens of the mobile devices, the main video represented by a plurality of video items to be provided to the mobile devices;
identify a number of the mobile devices that have joined the group;
select a primary image;
divide the primary image into portions based on the number of mobile devices that have joined the group;
transmit the portions of the primary image to the mobile devices;
receive an indication of an arrangement of the mobile devices that enables a presentation of the transmitted portions of the preliminary image in an intended order; and
in response to receiving the indication of the arrangement of the mobile devices, transmit a different video item of the plurality of video items representing the main video to each of the mobile devices based on the intended order.

16. The system of claim 15, wherein a first portion of the preliminary image corresponds to a left portion of the preliminary image and a second portion of the preliminary image corresponds to a right portion of the preliminary image, and wherein to transmit the different video item to each of the mobile devices according to the arrangement of the mobile devices, the processing device is further to:

transmit a first video item corresponding to a left portion of the main video to the mobile device that received the first portion corresponding to the left portion of the preliminary image; and transmit a second video item corresponding to a right portion of the main video to the mobile device that received the second portion corresponding to the right portion of the preliminary image.

17. The system of claim 15, wherein each portion of the preliminary image corresponds to a different portion of the preliminary image that is provided to a different mobile device.

18. The system of claim 15, wherein each of the different video items corresponds to a different view of the main video, wherein a first video item of the main video is associated with a first field of view and a second video item of the main video is associated with a second field of view, and wherein the first field of view is adjacent to the second field of view.

19. The system of claim 15, wherein the processing device is further to:

identify a context associated with the mobile devices, wherein the preliminary image is further selected based on the identified context.

20. The system of claim 19, wherein the context is at least one of a geographical location of one or more of the mobile devices or a time of when one or more of the mobile devices have joined the group.

* * * * *